(12) United States Patent
Lawarence et al.

(10) Patent No.: US 7,725,508 B2
(45) Date of Patent: May 25, 2010

(54) METHODS AND SYSTEMS FOR INFORMATION CAPTURE AND RETRIEVAL

(75) Inventors: Stephen R. Lawarence, Mountain View, CA (US); David Marmaros, Mountain View, CA (US); Niniane Wang, Santa Clara, CA (US); Omar Habib Khan, Toronto (CA); Mihai Florin Ionescu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 608 days.

(21) Appl. No.: 10/881,584

(22) Filed: Jun. 30, 2004

(65) Prior Publication Data

US 2005/0234848 A1    Oct. 20, 2005

(51) Int. Cl.
G06F 17/30 (2006.01)
(52) U.S. Cl. ...................................... 707/830
(58) Field of Classification Search ........................ None
See application file for complete search history.

(56) References Cited

U.S. PATENT DOCUMENTS

| | | | |
|---|---|---|---|
| 4,410,957 A | 10/1983 | Cason et al. | |
| 5,280,612 A | 1/1994 | Lorie et al. | |
| 5,321,838 A | 6/1994 | Hensley et al. | |
| 5,539,809 A | 7/1996 | Mayer et al. | |
| 5,555,346 A | 9/1996 | Gross et al. | |
| 5,566,336 A | 10/1996 | Futatsugi et al. | |
| 5,592,378 A | 1/1997 | Cameron et al. | |
| 5,623,652 A | 4/1997 | Vora et al. | |
| 5,701,469 A * | 12/1997 | Brandli et al. | 707/102 |
| 5,742,816 A | 4/1998 | Barr et al. | |
| 5,748,954 A * | 5/1998 | Mauldin | 707/10 |
| 5,793,948 A | 8/1998 | Asahi et al. | |
| 5,819,273 A | 10/1998 | Vora et al. | |
| 5,881,315 A | 3/1999 | Cohen | |
| 5,907,836 A | 5/1999 | Sumita et al. | |
| 5,956,722 A | 9/1999 | Jacobson | |
| 5,961,610 A | 10/1999 | Kelly et al. | |

(Continued)

FOREIGN PATENT DOCUMENTS

RU    2138076 C1    9/1999

(Continued)

OTHER PUBLICATIONS

U.S. Appl. No. 10/749,440, filed Dec. 31, 2003, Badros et al.

(Continued)

*Primary Examiner*—Tim T. Vo
*Assistant Examiner*—Hasanul Mobin
(74) *Attorney, Agent, or Firm*—Fenwick & West LLP

(57) ABSTRACT

Systems and methods that identify and extract information from articles are described. In one embodiment, a search engine implements a method comprising capturing an event in real time upon the occurrence of the event, wherein the event comprises a user interaction with an article on a client device, wherein the article is capable of being associated with at least one of a plurality of client applications, determining if the event should be indexed, and if the event should be indexed, indexing the event and storing the event and at least a portion of content associated with the article.

29 Claims, 3 Drawing Sheets

U.S. PATENT DOCUMENTS

| | | | |
|---|---|---|---|
| 5,964,839 | A | 10/1999 | Johnson et al. |
| 6,006,222 | A | 12/1999 | Culliss |
| 6,014,665 | A | 1/2000 | Culliss |
| 6,055,579 | A | 4/2000 | Goyal et al. |
| 6,073,130 | A | 6/2000 | Jacobson et al. |
| 6,078,916 | A | 6/2000 | Culliss |
| 6,119,147 | A | 9/2000 | Toomey et al. |
| 6,175,830 | B1 | 1/2001 | Maynard |
| 6,182,065 | B1 | 1/2001 | Yeomans |
| 6,182,068 | B1 | 1/2001 | Culliss |
| 6,184,880 | B1 | 2/2001 | Okada |
| 6,199,067 | B1 | 3/2001 | Geller |
| 6,202,065 | B1 | 3/2001 | Wills |
| 6,209,000 | B1 | 3/2001 | Klein et al. |
| 6,226,630 | B1 | 5/2001 | Bilmers |
| 6,240,548 | B1 | 5/2001 | Holzle et al. |
| 6,275,820 | B1 * | 8/2001 | Navin-Chandra et al. ...... 707/3 |
| 6,275,957 | B1 | 8/2001 | Novik et al. |
| 6,282,548 | B1 * | 8/2001 | Burner et al. ............... 707/102 |
| 6,321,228 | B1 | 11/2001 | Crandall et al. |
| 6,341,371 | B1 | 1/2002 | Tandri |
| 6,346,952 | B1 | 2/2002 | Shtivelman |
| 6,363,373 | B1 | 3/2002 | Steinkraus |
| 6,370,563 | B2 | 4/2002 | Murakami et al. |
| 6,380,924 | B1 | 4/2002 | Yee et al. |
| 6,393,438 | B1 | 5/2002 | Kathrow et al. |
| 6,401,239 | B1 | 6/2002 | Miron |
| 6,446,076 | B1 | 9/2002 | Burkey et al. |
| 6,477,585 | B1 | 11/2002 | Cohen et al. |
| 6,480,837 | B1 | 11/2002 | Dutta |
| 6,490,577 | B1 | 12/2002 | Anwar |
| 6,513,036 | B2 | 1/2003 | Fruensgaard et al. |
| 6,526,405 | B1 | 2/2003 | Mannila et al. |
| 6,532,023 | B1 | 3/2003 | Schumacher et al. |
| 6,560,655 | B1 | 5/2003 | Grambihler et al. |
| 6,581,056 | B1 | 6/2003 | Rao |
| 6,592,627 | B1 | 7/2003 | Agrawal et al. |
| 6,604,236 | B1 | 8/2003 | Draper et al. |
| 6,631,345 | B1 * | 10/2003 | Schumacher et al. .......... 703/22 |
| 6,658,423 | B1 | 12/2003 | Pugh et al. |
| 6,681,247 | B1 | 1/2004 | Payton |
| 6,691,175 | B1 | 2/2004 | Lodrige et al. |
| 6,697,838 | B1 | 2/2004 | Jakobson |
| 6,708,293 | B2 | 3/2004 | Kaler et al. |
| 6,728,763 | B1 | 4/2004 | Chen |
| 6,772,143 | B2 | 8/2004 | Hung |
| 6,779,030 | B1 | 8/2004 | Dugan et al. |
| 6,782,381 | B2 | 8/2004 | Nelson et al. |
| 6,826,553 | B1 | 11/2004 | DaCosta et al. |
| 6,853,950 | B1 | 2/2005 | O-Reilly et al. |
| 6,864,901 | B2 | 3/2005 | Chang et al. |
| 6,865,715 | B2 | 3/2005 | Uchino et al. |
| 6,873,982 | B1 | 3/2005 | Bates et al. |
| 6,877,027 | B1 | 4/2005 | Spencer et al. |
| 6,907,577 | B2 | 6/2005 | Tervo |
| 6,934,740 | B1 | 8/2005 | Lawande et al. |
| 6,963,830 | B1 | 11/2005 | Nakao |
| 6,968,509 | B1 | 11/2005 | Chang et al. |
| 6,981,040 | B1 | 12/2005 | Konig et al. |
| 6,983,310 | B2 | 1/2006 | Rouse et al. |
| 7,016,919 | B2 | 3/2006 | Cotton et al. |
| 7,080,073 | B1 | 7/2006 | Jiang et al. |
| 7,096,255 | B2 | 8/2006 | Malik |
| 7,099,887 | B2 | 8/2006 | Hoth et al. |
| 7,162,473 | B2 * | 1/2007 | Dumais et al. ................ 707/5 |
| 7,200,802 | B2 | 4/2007 | Kawatani |
| 7,233,948 | B1 | 6/2007 | Shamoon et al. |
| 7,245,910 | B2 | 7/2007 | Osmo |
| 7,328,242 | B1 | 2/2008 | McCarthy et al. |
| 7,330,536 | B2 | 2/2008 | Claudatos et al. |
| 7,383,307 | B2 | 6/2008 | Kirkland et al. |
| 7,412,491 | B2 | 8/2008 | Gusler et al. |
| 7,437,444 | B2 | 10/2008 | Houri |
| 7,457,872 | B2 | 11/2008 | Aton et al. |
| 7,467,390 | B2 | 12/2008 | Gilgen et al. |
| 7,475,406 | B2 | 1/2009 | Banatwala et al. |
| 7,499,974 | B2 | 3/2009 | Karstens |
| 7,500,249 | B2 | 3/2009 | Kampe et al. |
| 7,577,667 | B2 * | 8/2009 | Hinshaw et al. ............. 707/100 |
| 2001/0016852 | A1 | 8/2001 | Peairs et al. |
| 2002/0042789 | A1 | 4/2002 | Michalewicz et al. |
| 2002/0049608 | A1 | 4/2002 | Hartsell et al. |
| 2002/0059245 | A1 | 5/2002 | Zakharov et al. |
| 2002/0059425 | A1 | 5/2002 | Belfiore et al. |
| 2002/0065802 | A1 | 5/2002 | Uchiyama |
| 2002/0073076 | A1 | 6/2002 | Xu et al. |
| 2002/0078256 | A1 | 6/2002 | Gehman et al. |
| 2002/0087507 | A1 * | 7/2002 | Hopewell et al. .............. 707/1 |
| 2002/0091568 | A1 | 7/2002 | Kraft et al. |
| 2002/0091972 | A1 | 7/2002 | Harris et al. |
| 2002/0103664 | A1 | 8/2002 | Olsson et al. |
| 2002/0116291 | A1 | 8/2002 | Grasso et al. |
| 2002/0138467 | A1 | 9/2002 | Jacobson et al. |
| 2002/0156760 | A1 | 10/2002 | Lawrence et al. |
| 2002/0165903 | A1 | 11/2002 | Zargham et al. |
| 2002/0174101 | A1 | 11/2002 | Fernley et al. |
| 2002/0178383 | A1 | 11/2002 | Hrabik et al. |
| 2002/0184224 | A1 | 12/2002 | Haff et al. |
| 2002/0184406 | A1 | 12/2002 | Aliffi |
| 2003/0001854 | A1 | 1/2003 | Jade et al. |
| 2003/0018521 | A1 | 1/2003 | Kraft et al. |
| 2003/0028506 | A1 | 2/2003 | Yu |
| 2003/0028896 | A1 | 2/2003 | Swart et al. |
| 2003/0036848 | A1 | 2/2003 | Sheha et al. |
| 2003/0041112 | A1 * | 2/2003 | Tada et al. ................. 709/206 |
| 2003/0050909 | A1 | 3/2003 | Preda et al. |
| 2003/0055816 | A1 | 3/2003 | Paine et al. |
| 2003/0055828 | A1 | 3/2003 | Koch et al. |
| 2003/0088433 | A1 | 5/2003 | Young et al. |
| 2003/0123442 | A1 | 7/2003 | Drucker et al. |
| 2003/0123443 | A1 | 7/2003 | Anwar |
| 2003/0126136 | A1 | 7/2003 | Omoigui |
| 2003/0130984 | A1 | 7/2003 | Quinlan et al. |
| 2003/0131000 | A1 | 7/2003 | Bates et al. |
| 2003/0131061 | A1 | 7/2003 | Newton et al. |
| 2003/0149694 | A1 | 8/2003 | Ma et al. |
| 2003/0154071 | A1 | 8/2003 | Shreve |
| 2003/0167266 | A1 | 9/2003 | Saldanha et al. |
| 2003/0182480 | A1 * | 9/2003 | Varma et al. ................... 710/52 |
| 2003/0187837 | A1 | 10/2003 | Culliss |
| 2004/0002959 | A1 | 1/2004 | Alpert et al. |
| 2004/0003038 | A1 | 1/2004 | Huang et al. |
| 2004/0031027 | A1 | 2/2004 | Hiltgen |
| 2004/0054737 | A1 | 3/2004 | Daniell |
| 2004/0064447 | A1 | 4/2004 | Simske et al. |
| 2004/0095852 | A1 | 5/2004 | Griner et al. |
| 2004/0098609 | A1 | 5/2004 | Bracewell et al. |
| 2004/0128285 | A1 | 7/2004 | Green et al. |
| 2004/0133560 | A1 | 7/2004 | Simske |
| 2004/0133561 | A1 | 7/2004 | Burke |
| 2004/0143569 | A1 | 7/2004 | Gross et al. |
| 2004/0155910 | A1 | 8/2004 | Chang et al. |
| 2004/0187075 | A1 | 9/2004 | Maxham et al. |
| 2004/0193596 | A1 * | 9/2004 | Defelice et al. ................ 707/5 |
| 2004/0215715 | A1 | 10/2004 | Ehrich et al. |
| 2004/0230572 | A1 | 11/2004 | Omoigui |
| 2004/0254938 | A1 | 12/2004 | Marcjan et al. |
| 2004/0255301 | A1 | 12/2004 | Turski et al. |
| 2004/0261026 | A1 | 12/2004 | Corson |
| 2004/0267700 | A1 | 12/2004 | Dumais et al. |
| 2004/0267756 | A1 | 12/2004 | Bayardo et al. |
| 2005/0021542 | A1 | 1/2005 | Irle et al. |
| 2005/0033803 | A1 | 2/2005 | Vleet et al. |
| 2005/0057584 | A1 | 3/2005 | Gruen et al. |

| | | | |
|---|---|---|---|
| 2005/0060310 | A1 | 3/2005 | Tong et al. |
| 2005/0060719 | A1 | 3/2005 | Gray et al. |
| 2005/0076115 | A1 | 4/2005 | Andrews et al. |
| 2005/0080866 | A1 | 4/2005 | Kent, Jr. et al. |
| 2005/0108332 | A1 | 5/2005 | Vaschillo et al. |
| 2005/0114487 | A1 | 5/2005 | Peng et al. |
| 2005/0192921 | A1 | 9/2005 | Chaudhuri et al. |
| 2005/0251526 | A1* | 11/2005 | Nayak ........................ 707/100 |
| 2005/0262073 | A1 | 11/2005 | Reed et al. |
| 2006/0167704 | A1 | 7/2006 | Nicholls et al. |
| 2007/0022155 | A1 | 1/2007 | Owens et al. |
| 2007/0055689 | A1 | 3/2007 | Rhoads et al. |
| 2007/0208697 | A1 | 9/2007 | Subramaniam et al. |

FOREIGN PATENT DOCUMENTS

| | | |
|---|---|---|
| WO | WO 01/62004 A2 | 8/2001 |
| WO | WO 02/069118 | 9/2002 |

OTHER PUBLICATIONS

Dumais, S., et al, "Stuff I've Seen: A System for Personal Information Retrieval and Re-Use," Microsoft Research, *SIGIR'03*, Jul. 28-Aug. 1, 2003, pp. 1-8.

Enfish, http://www.enfish.com, printed Mar. 16, 2004.

Fast Search & Transfer—Home—Enterprise Search, http://solutions.altavista.com/en/news/pr_020402_desktop.shtmu, printed Mar. 16, 2004.

Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.

Geisler, G., "Enriched Links: A Framework for Improving Web Navigation Using Pop-Up Views," pp. 1-14, 2000.

ISYS Search Software—ISYS: desktop, http://www.isysusa.com/products/desktop/index.html, printed Mar. 16, 2004.

Joachims, T., et al., "WebWatcher: A Tour Guide for the World Wide Web," 1996.

Markoff, J., "Google Moves Toward Clash with Microsoft," *The New York Times*, May 19, 2004, http://www.nytimes.com/2004/5/19/technology/19google.html?ex=1085964389&ei=1&e..., pp. 1-4, printed May 19, 2004.

Naraine, R., "Future of Search Will Make You Dizzy," Enterprise, May 20, 2004, http://www.internetnews.com/ent-news/article.php/3356831, pp. 1-4, printed May 21, 2004.

"Overview," Stuff I've Seen—Home Page, http://research.Microsoft.com/adapt/sis/index.htm, pp. 1-2, printed May 26, 2004.

Rhodes, B., "Margin Notes Building a Contextually Aware Associative Memory," *The Proceedings of the International Conference on Intelligent User Interfaces (IUI'00)*, Jan. 9-12, 2000.

Rhodes, B., et al., "Just-in-time information retrieval agents," *Systems Journal*, vol. 39, Nos. 3&4, 2000, pp. 685-704.

Rhodes, B., et al., "Remembrance Agent—A continuously running automated information retrieval system," *The Proceedings of the First International Conference on the Practical Application of Intelligent Agents and Multi Agent Technology* (PAAM '96), pp. 487-495.

Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm..., pp. 1-5, printed Apr. 21, 2004.

"Searching for the next Google—New trends are helping nimble startups elbow in to the plundered market," Red Herring—The Business of Technology, Mar. 9, 2004, http://redherring.com/PrintArticle.aspx?a=4782&sector=Capital, p. 1-5, printed Mar. 30, 2004.

"Selecting Task-Relevant Sources for Just-In-Time Retrieval," pp. 1-3, no date.

Sherman, C., "HotBot's New Desktop Search Toolbar," www.searchenginewatch.com, http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Releases Search Software," *The Search Engine Report*, Aug. 4, 1998, pp. 1-2.

WebWatcher Home Page, "Welcome to the WebWatcher Project," http://www-2.cs.cmu.edu/~webwatcher/, printed Oct. 15, 2003.

"WhenU Just-In-Time Marketing," http://www.whenu.com, printed Mar. 19, 2004.

X1 instantly searches files & email. For outlook, Outlook, http://www.x1.com/, printed Mar. 15, 2004.

Zellweger, P., et al., "Fluid Links for Informed and Incremental Link Transitions," Proceedings of Hypertext'98, Pittsburgh, PA, Jun. 20-24, 1998, pp. 50-57.

U.S. Appl. No. 10/814,773, filed Mar. 31, 2004, Lawrence et al.

"About Spector CNE," Spectorsoft, 1 page, [online] [Retrieved on May 23, 2007] Retrieved from the Internet: URL: http://www.spectorsoft.com/products/spectorcne_windows/help/v40/webhelp/About_Spector_CNE>.

Knezevic, P. et al., "The Architecture of the Obelix—An Improved Internet Search Engine," Proceedings of the 33$^{rd}$ Annual Hawaii International Conference on System Sciences (HICSS) Jan. 4-7, 2000, Maui, HI, USA, pp. 2145-2155.

Morita, M. et al., "Information Filtering Based on User Behavior Analysis and Best Match Text Retrieval," Proceedings of the Annual International ACM-SIGIR Conference on Research and Development in Information Retrieval, Dublin, Jul. 3-6, 1994, pp. 272-281.

"Spector Corporate Network Edition 4.0 (Spector CNE) Online User Manual," SpectorSoft Corporation, 2003, [online] [retrieved on May 12, 2005] Retrieved from the Internet: <URL: http://www.spectorsoft.com/products/spectorcne_windows/help/v40/webhelp/>.

International Preliminary Report on Patentabiity, PCT/US2005/003386, Jun. 24, 2005, 8 pages.

International Search Report and Written Opinion, PCT/US2005/010985, Apr. 26, 2007, 9 pages.

International Search Report and Written Opinion, PCT/US2004/038562, Apr. 6, 2005.

80-20 Software—Products—80-20 One Search, http://www.80-20.com/products/one-search/retriever.asp, printed Mar. 16, 2004.

"askSam™ Making Information Useful," askSam,—Organize your information with askSam, http://www.asksam.com/brochure.asp, printed Mar. 15, 2004.

Alexa® Web Search—Toolbar Quick Tour, http://pages.alexa.com/prod_serv/quicktour.html, pp. 1-5, printed Mar. 16, 2004.

Barrett, R. et al., "How to Personalize the Web," IBM Research, http://www.almaden.ibm.com/cs/wbi/papers/chi97/wblpaper.html, pp. 1-13, printed Mar. 16, 2004.

Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.

Boyan, J., et al., "A Machine Learning Architecture for Optimizing Web Search Engines," School of Computer Science, Carnegie Mellon University, May 10, 1996, pp. 1-8.

Bradenbaugh, F., "Chapter 1 The Client-Side Search Engine," *JavaScript Cookbook*, 1$^{st}$ Ed., Oct. 1999, O'Reilly™ Online Catalog, http://www.oreilly.com/catalog/jscook/chapter/ch01.html, pp. 1-30, printed Dec. 29, 2003.

Brin, S., et al, "The Anatomy of a Large-Scale Hypertextual Web Search Engine," http://www7.scu.edu.au/programme/fullpapers/1921/com1921.htm, pp. 1-18, 1998.

Budzik, J., et al., User Interactions with Everyday Applications as Context for Just-in-time Information Access, Intelligent Information Laboratory, Northwestern University, pp. 1-8, no date.

DEVONthink, http://www.devon-techonologies.com/products/devonthink.php, printed Mar. 16, 2004.

dtSearch®—http://www.dtsearch.com/, printed Mar. 15, 2004.

Bengel, J., et al., "Archiving and Indexing Chat Utterances," Electrical Engineering and Computer-Science and Information Technology Telecommunications Center University of Kansas, 2003.

Huang, Q., et al., Multimedia Search and Retrieval: New Concepts, System Implementation, and Application, Circuits and Systems for Video Technology, IEEE Transaction s on Circuits and Systems for Video Technology, Aug. 2000, pp. 679-692, vol. 10. Issue 5.

Pingali, G. S., et al., "Instantly Indexed Multimedia Databases of Real World Events," IEEE Transactions on Multimedia, Jun. 2002, pp. 269-282, vol. 4, Issue 2.

Sengupta, S., et al., Designing a Value Based Niche Search Engine Using Evolutionary Strategies, Proceedings of the International Conference of Information Technology: Coding and Computing (ITCC'05), IEEE, 2005, Pennsylvania State University.

PCT International Search Report and Written Opinion, PCT/US05/10687, Sep. 10, 2008, 14 pages.

PCT International Search Report and Written Opinion, PCT/US05/10685, Jul. 3, 2008, 11 pages.

Examination Report, European Patent Application No. 05731427.0, Jul. 28, 2008, 5 pages.

European Examination Report, European Application No. EP 05731490.8, Jul. 7, 2008, 5 pages.

European Search Report, European Application No. EP 05731490.8, Apr. 28, 2008, 4 pages.

First Office Action of China State Intellectual Property Office, Chinese Application No. 200580009380.4, Dec. 26, 2008.

Bacon, J. et al., "Event Storage and Federation Using ODMG," 2000, pp. 265-281, vol. 2135, [online] Retrieved from the Internet<URL: http://citeseer.ist.psu.edu/bacon00event.html>.

Spiteri, M.D. et al., "An Architecture to Support Storage and Retrieval of Events," Sep. 1998, pp. 443-458, [online] Retrieved from the Internet<URL:http://citeseer.ist.psu.edu/spiteri98architecture.html>.

Spiteri, M.D., "An Architecture for the Notification, Storage and Retrieval of Events," Jan. 2000, pp. 1-165 pages, [online] Retrieved from the Internet<URL:http://citeseer.ist.psu.edu/spiteri00architecture.html>.

Jonathan Bennett & Autolt Team, "Autolt v3 Homepage," Verson v3.0.102, 1999-2004, 26 pages, [online] [Archived on Aug. 13, 2004; Retrieved on Dec. 2, 2008] Retrieved from the internet <URL:http://web.archive.org/web/20040813195143/http://www.autoitscript.com/autoit3/docs/>.

Budzik, J., "Information access in context," Knowledge-Based Systems, Elsevier 2001, pp. 37-53, vol. 14.

Gemmell, J., et al., "Living with a Lifetime Store," Proc. ATR Workshop on Ubiquitous Experience Media, Sep. 9-10, 2003, pp. 69-76.

Gemmell, J., et al., "The MyLifeBits Lifetime Store," Proceedings of the 2003 ACM SIGMM Workshop on Experimental Telepresence, Nov. 7, 2003, pp. 80-83.

Rekimoto, J., "Time-Machine Computing: A Time-centric Approach for the Information Environment," Proceedings of the Annual ACM Symposium on User Interface Software and Technology, Nov. 7, 1999, pp. 1-10.

Office Action for Chinese Patent Application No. 200580009380.4, Dec. 26, 2008, 8 pages.

* cited by examiner

METHODS AND SYSTEMS FOR INFORMATION CAPTURE AND RETRIEVAL

FIELD OF THE INVENTION

The invention generally relates to search engines. More particularly, the invention relates to methods and systems for information capture and retrieval.

BACKGROUND OF THE INVENTION

Users generate and access a large number of articles, such as emails, web pages, word processing documents, spreadsheet documents, instant messenger messages, and presentation documents, using a client device, such as a personal computer, personal digital assistant, or mobile phone. Some articles are stored on one or more storage devices coupled to, accessible by, or otherwise associated with the client device(s). Users sometimes wish to search the storage device(s) for articles.

Conventional client-device search applications may significantly degrade the performance of the client device. For example, certain conventional client-device search applications typically use batch processing to index all articles, which can result in noticeably slower performance of the client device during the batch processing. Additionally, batch processing occurs only periodically. Therefore, when a user performs a search, the most recent articles are sometimes not included in the results. Moreover, if the batch processing is scheduled for a time when the client device is not operational and is thus not performed for an extended period of time, the index of articles associated with the client device can become outdated. Conventional client-device search applications may also need to rebuild the index at each batch processing or build new partial indexes and perform a merge operation that can use significant client-device resources. Conventional client-device search applications also sometimes use a great deal of system resources when operational, resulting in slower performance of the client device.

Additionally, conventional client-device search applications can require an explicit search query from a user to generate results, and may be limited to examining file names or the contents of a particular application's files.

SUMMARY

Embodiments of the present invention comprise methods and systems for information capture and retrieval. In one embodiment, a search engine implements a method comprising capturing an event in real time upon the occurrence of the event, wherein the event comprises a user interaction with an article on a client device, wherein the article is capable of being associated with at least one of a plurality of client applications, determining if the event should be indexed, and if the event should be indexed, indexing the event and storing the event and at least a portion of content associated with the article. In another embodiment, a search engine implements a method comprising capturing a plurality of events occurring on a client device, wherein the events are associated with at least one of a plurality of client applications, wherein at least some of the events are captured in real time upon the occurrence of the event, indexing and storing at least some of the events, wherein the events that are indexed and stored have an associated article, receiving a search query, and locating relevant articles from events relevant to the search query.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Figure 1:
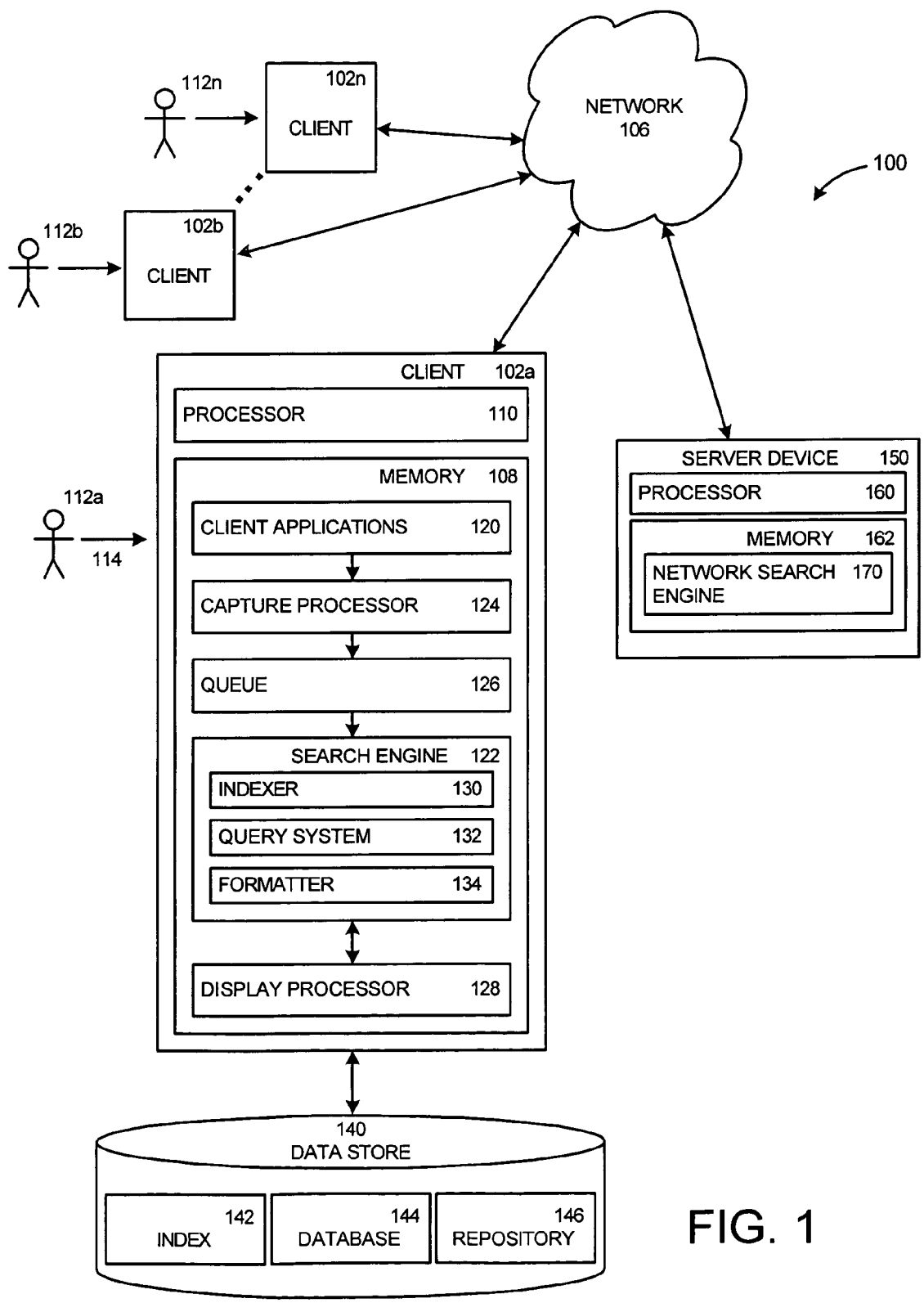
FIG. 1 is a diagram illustrating an exemplary environment in which one embodiment of the present invention may operate.

Referring now to the drawings in which like numerals indicate like elements throughout the several figures, FIG. 1 is a block diagram illustrating an exemplary environment for implementation of an embodiment of the present invention. While the environment shown reflects a client-side search engine architecture embodiment, other embodiments are possible. The system 100 shown in FIG. 1 includes multiple client devices 102a-n that can communicate with a server device 150 over a network 106. The network 106 shown comprises the Internet. In other embodiments, other networks, such as an intranet, may be used instead. Moreover, methods according to the present invention may operate within a single client device that does not communicate with a server device or a network.

The client devices 102a-n shown in FIG. 1 each include a computer-readable medium 108. The embodiment shown in FIG. 1 includes a random access memory (RAM) 108 coupled to a processor 110. The processor 110 executes computer-executable program instructions stored in memory 108. Such processors may include a microprocessor, an ASIC, state machines, or other processor, and can be any of a number of suitable computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

Client devices 102a-n can be coupled to a network 106, or alternatively, can be stand alone machines. Client devices 102a-n may also include a number of external or internal devices such as a mouse, a CD-ROM, DVD, a keyboard, a display device, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any suitable operating system, such as Microsoft® Windows® or Linux, capable of supporting one or more client application programs. For example, the client device 102a can comprise a personal computer executing client application programs, also known as client applications 120. The client applications 120 can be contained in memory 108 and can include, for example, a word processing application, a spreadsheet application, an email application, an instant messenger application, a presentation application, an Internet browser application, a calendar/organizer application, a video playing application, an audio playing application, an image display application, a file management program, an operating system shell, and other applications capable of being executed by a client device. Client applications may also include client-side applications that interact with or access other applications (such as, for example, a web-browser executing on the client device 102a that interacts with a remote email server to access email).

The user 112a can interact with the various client applications 120 and articles associated with the client applications 120 via various input and output devices of the client device 102a. Articles include, for example, word processor documents, spreadsheet documents, presentation documents, emails, instant messenger messages, database entries, calendar entries, appointment entries, task manager entries, source code files, and other client application program content files, messages, items, web pages of various formats, such as HTML, XML, XHTML, Portable Document Format (PDF) files, and media files, such as image files, audio files, and video files, or any other documents or items or groups of documents or items or information of any suitable type whatsoever.

The user's 112a interaction with articles, the client applications 120, and the client device 102a creates event data that may be observed, recorded, analyzed or otherwise used. An event can be any occurrence possible associated with an article, client application 120, or client device 102a, such as inputting text in an article, displaying an article on a display device, sending an article, receiving an article, manipulating an input device, opening an article, saving an article, printing an article, closing an article, opening a client application program, closing a client application program, idle time, processor load, disk access, memory usage, bringing a client application program to the foreground, changing visual display details of the application (such as resizing or minimizing) and any other suitable occurrence associated with an article, a client application program, or the client device whatsoever. Additionally, event data can be generated when the client device 102a interacts with an article independent of the user 112a, such as when receiving an email or performing a scheduled task.

The memory 108 of the client device 102a can also contains a capture processor 124, a queue 126, and a search engine 122. The client device 102a can also contains or is in communication with a data store 140. The capture processor 124 can capture events and pass them to the queue 126. The queue 126 can pass the captured events to the search engine 122 or the search engine 122 can retrieve new events from the queue 126. In one embodiment, the queue 126 notifies the search engine 122 when a new event arrives in the queue 126 and the search engine 122 retrieves the event (or events) from the queue 126 when the search engine 122 is ready to process the event (or events). When the search engine receives an event it can be processed and can be stored in the data store 140. The search engine 122 can receive an explicit query from the user 112a or generate an implicit query and it can retrieve information from the data store 140 in response to the query. In another embodiment, the queue is located in the search engine 122. In still another embodiment, the client device 102a does not have a queue and the events are passed from the capture processor 124 directly to the search engine 122. According to other embodiments, the event data is transferred using an information exchange protocol. The information exchange protocol can comprise, for example, any suitable rule or convention facilitating data exchange, and can include, for example, any one of the following communication mechanisms: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The capture processor 124 can capture an event by identifying and compiling event data associated with an event. Examples of events include sending or receiving an email message, a user viewing a web page, saving a word processing document, printing a spreadsheet document, inputting text to compose or edit an email, opening a presentation application, closing an instant messenger application, entering a keystroke, moving the mouse, copying text to the clipboard, and hovering the mouse over a hyperlink. An example of event data captured by the capture processor 124 for an event involving the viewing of a web page by a user can comprise the URL of the web page, the time and date the user viewed the web page, the content of the web page in original or processed forms, the size of the original document, a screenshot of the web page as displayed to the user, a thumbnail version of the screenshot, and an icon associated with the web page or website.

In the embodiment shown in FIG. 1, the capture processor 124 comprises multiple capture components. For example, the capture processor 124 shown in FIG. 1 comprises a separate capture component for each client application in order to capture events associated with each application. The capture processor 124 can also comprise a separate capture component that monitors overall network activity in order to capture event data associated with network activity, such as the receipt or sending of an instant messenger message. The capture processor 124 shown in FIG. 1 also can comprise a separate client-device capture component that monitors overall client device performance data, such as processor load, idle time, disk access, the client applications in use, and the amount of memory available. The capture processor 124 shown in FIG. 1 also comprises a separate capture component to monitor and capture keystrokes input by the user and a separate capture component to monitor and capture items, such as text, displayed on a display device associated with the client device 102a. An individual capture component can monitor multiple client application and multiple capture components can monitor different aspects of a single client application.

In one embodiment, the capture processor 124, through the individual capture components, can monitor activity on the client device and can capture events by a generalized event definition and registration mechanism, such as an event schema. Each capture component can define its own event schema or can use a predefined one. Event schema can differ depending on the client application or activity the capture component is monitoring. Generally, the event schema can describe the format for an event, for example, by providing fields for event data associated with the event (such as the time of the event) and fields related to any associated article (such as the title) as well as the content of any associated article (such as the document body). An event schema can describe the format for any suitable event data that relates to an event. For example, an event schema for an email message event received by the user 112a can include the sender, the recipient or list of recipients, the time sent, the date sent, and the content of the message. An event schema for a web page currently being viewed by a user can include the Uniform Resource Locator (URL) of the web page, the time that the web page was viewed, the length of time that the user spent viewing the web page, and the content of the web page. An event schema for a word processing document being saved by a user can include the title of the document, the time saved, the format of the document, the text of the document, and the location of the document. More generally, an event schema can describe the state of the system around the time of the event. For example, an event schema can contain a URL for a web page event associated with a previous web page that the user navigated from. In addition, event schema can describe fields with more complicated structure like lists. For example, an event schema can contain fields that list multiple recipients. An event schema can also contain optional fields so that an application can include additional event data if desired. An event can be captured by compiling event data into the fields described by the associated event schema.

The capture processor 124 can capture events occurring presently (or "real-time events") and can capture events that have occurred in the past (or "historical events"). Real-time events can be "indexable" or "non-indexable". In one embodiment, the search engine 122 indexes indexable real-time events, but does not index non-indexable real-time events. The search engine 122 may determine whether to index an event based on the importance of the event. Indexable real-time events can be more important events associated with an article, such as viewing a web page, loading or saving a file, and receiving or sending an instant message or email. Non-indexable events can be deemed not important enough by the search engine 122 to index and store the event, such as moving the mouse or selecting a portion of text in an article. Alternatively, the capture processor 124 may be able to determine that events are not important enough, and not send them to the queue 126. In this embodiment, the load on the queue 126 can be reduced and the system speed can be increased. Non-indexable and/or indexable events can be used by the search engine 122 to update the current user state. While all real-time events can relate to what the user is currently doing (or the current user state), indexable real-time events can be indexed and stored in the data store 140. Alternatively, the search engine 122 can index all real-time events. Real-time events can include, for example, sending or receiving an article, such as an instant messenger message, examining a portion of an article, such as selecting a portion of text or moving a mouse over a portion of a web page, changing an article, such as typing a word in an email or pasting a sentence in a word processing document, closing an article, such as closing an instant messenger window or changing an email message being viewed, loading, saving, opening, or viewing an article, such as a word processing document, web page, or email, listening to or saving an MP3 file or other audio/video file, or updating the metadata of an article, such as bookmarking a web page, printing a presentation document, deleting a word processing document, or moving a spreadsheet document.

Historical events are similar to indexable real-time events except that the event occurred before the installation of the search engine 122 or was otherwise not captured, because, for example, the search engine 122 was not operational for a period of time while the client device 102a was operational or because no capture component existed for a specific type of historical event at the time the event took place. Examples of historical events include the user's saved word processing documents, media files, presentation documents, calendar entries, and spreadsheet documents, the emails in a user's inbox, web pages in the user's cache, past instant messenger conversations, and the web pages bookmarked by the user. The capture processor 124 can capture historical events by periodically crawling the memory 108 and any associated data storage device for events not previously captured by the capture processor 124. The capture processor 124 can also capture historical events by requesting certain client applications, such as a web browser or an email application, to retrieve articles and other associated information. For example, the capture processor 124 can request that the web browser application obtain all viewed web pages by the user or request that the email application obtain all email messages associated with the user. These articles may not currently exist in memory 108 or on a storage device of the client device 102a. For example, the email application may have to retrieve emails from a server device. In one embodiment, the search engine 122 indexes historical events.

In one embodiment, the search engine 122 may selectively capture and index historical events. For example, article data associated with the article for the event can be used in part to determine whether to capture and index the event. Article data can comprise, for example, the location of the article, the file type of the article, and access data for the article. In one embodiment, article data is used to determine a capture score and the capture score is compared to a threshold value. If the capture score for a particular event is above the threshold value, then the event is captured and indexed. If the capture score for an article is below the threshold value, then the event is not captured or indexed. Similarly, the search engine 122 may selectively capture and index real-time events.

In one embodiment shown in FIG. 1, events captured by the capture processor 124 are sent to the queue 126 in the format described by an event schema. The capture processor 124 can also send performance data to the queue 126. Examples of performance data include current processor load, average processor load over a predetermined period of time, idle time, disk access, the client applications in use, and the amount of memory available. Performance data can also be provided by specific performance monitoring components, some of which may be part of the search engine 122, for example. The performance data in the queue 126 can be retrieved by the search engine 122 and the capture components of the capture processor 124. For example, capture components can retrieve the performance data to alter how many events are sent to the queue 126 or how detailed the events are that are sent (fewer or smaller events when the system is busy) or how frequently events are sent (events are sent less often when the system is busy or there are too many events waiting to be processed).

The search engine 122 can use performance data to determine when it indexes various events and when and how often it issues implicit queries.

In one embodiment, the queue 126 holds events until the search engine 122 is ready to process an event or events. Alternatively, the queue 126 uses the performance data to help determine how quickly to provide the events to the search engine 122. The queue 126 can comprise one or more separate queues—including a user state queue and an index queue. The index queue can queue indexable events, for example. Alternatively, the queue 126 can have additional queues or comprise a single queue. The queue 126 can be implemented as a circular priority queue using memory mapped files. The queue can be a multiple priority queue where higher priority events are served before lower priority events, and other components may be able to specify the type of events they are interested in. Generally, real-time events can be given higher priority than historical events, and indexable events can be given higher priority than non-indexable real-time events. Other implementations of the queue 126 are possible. In another embodiment, the client device 102a does not have a queue 126. In this embodiment, events are passed directly from the capture processor to the search engine 122. In other embodiments, events can be transferred between the capture components and the search engine using suitable information exchange mechanisms such as: Extensible Markup Language—Remote Procedure Calling protocol (XML/RPC), Hypertext Transfer Protocol (HTTP), Simple Object Access Protocol (SOAP), shared memory, sockets, local or remote procedure calling, or any other suitable information exchange mechanism.

The search engine 122 can contain an indexer 130, a query system 132, and a formatter 134. The query system 132 can retrieve real-time events and performance data from the queue 126. The query system 132 can use performance data and real-time events to update the current user state and generate an implicit query. An implicit query can be an automatically generated query based on the current user state. The query system 132 can also receive and process explicit queries from the user 112a. Performance data can also be retrieved by the search engine 122 from the queue 126 for use in determining the amount of activity possible by the search engine 122.

In the embodiment shown in FIG. 1, indexable real-time events and historical events (indexable events) are retrieved from the queue 126 by the indexer 130. Alternatively, the queue 126 may send the indexable events to the indexer 130. The indexer 130 can index the indexable events and can send them to the data store 140 where they are stored. The data store 140 can be any type of computer-readable media and can be integrated with the client device 102a, such as a hard drive, or external to the client device 102a, such as an external hard drive or on another data storage device accessed through the network 106. The data store can be one or more logical or physical storage areas. In one embodiment, the data store 140 can be in memory 108. The data store 140 may use one or a combination of methods for storing data, including without limitation, arrays, hash tables, lists, and pairs, and may include compression and encryption. In the embodiment shown in FIG. 1, the data store comprises an index 142, a database 144 and a repository 146.

In one embodiment, when the indexer 130 receives an event, the indexer 130 can determine, from the event, terms (if any) associated with the event, the time of the event (if available), images (if any) associated with the event, and/or other information defining the event. The indexer 130 can determine if the event is a duplicate of a previously received event. The indexer 130 can also determine if the event relates to other events and associate the event with related events. For example, for a received email event, the indexer 130 can associate the email with other message events from the same conversation. As additional examples, the indexer 130 can associate an event with other events based on text contained in the events or based on the time of the events. The emails from the same conversation can be associated with each other in a related event object, which can be stored in the data store 140.

The indexer 130 can send and incorporate the terms and location information, associated with the event in the index 142 of the data store 140. The event can be sent to the database 144 for storage and the content of the associated article and any associated images can be stored in the repository 146. The conversation object associated with email messages can be stored in the database 144.

In the embodiment shown in FIG. 1, a user 112a can input an explicit query into a search engine interface displayed on the client device 102a, which is received by the search engine 122. The search engine 122 can also generate an implicit query based on a current user state, which can be determined by the query system 132 from real-time events. Based on the query, the query system 132 can locate relevant information in the data store 140 and provide a result set. In one embodiment, the result set comprises article identifiers for articles associated with the client applications 120 or client articles. Client articles include articles associated with the user 112a or client device 102a, such as the user's emails, word processing documents, instant messenger messages, previously viewed web pages and any other article or portion of an article associated with the client device 102a or user 112a. An article identifier may be, for example, a Uniform Resource Locator (URL), a file name, a link, an icon, a path for a local file, or other suitable information that may identify an article. In another embodiment, the result set also comprises article identifiers for articles located on the network 106 or network articles located by a search engine on a server device. Network articles include articles located on the network 106 not previously viewed or otherwise referenced by the user 112a, such as web pages not previously viewed by the user 112a.

The formatter 134 can receive the search result set from the query system 132 of the search engine 122 and can format the results for output to a display processor 128. In one embodiment, the formatter 134 can format the results in XML, HTML, or tab delineated text. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. The display processor 128 can be associated with a set of APIs to allow various application to receive the results and display them in various formats. The display APIs can be implemented in various ways, including, for example, Windows messaging, DLL exports, COM interface, VB, JAVA, or .NET libraries, or a web service.

Through the client devices 102a-n, users 112a-n can communicate over the network 106, with each other and with other systems and devices coupled to the network 106. As shown in FIG. 1, a server device 150 can be coupled to the network 106. In the embodiment shown in FIG. 1, the search engine 122 can transmit a search query comprised of an explicit or implicit query or both to the server device 150. The user 112a can also enter a search query in a search engine interface, which can be transmitted to the server device 150 by the client device 102a via the network 106. In another embodiment, the query signal may instead be sent to a proxy server (not shown), which then transmits the query signal to server device 150. Other configurations are also possible.

The server device 150 can include a server executing a search engine application program, such as the Google™ search engine. In other embodiments, the server device 150 can comprise a related information server or an advertising server. Similar to the client devices 102a-n, the server device 150 can include a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of computer processors, such as processors from Intel Corporation of Santa Clara, Calif. and Motorola Corporation of Schaumburg, Ill. In another embodiment, the server device 150 may exist on a client-device. In still another embodiment, there can be multiple server devices 150.

Memory 162 contains the search engine application program, also known as a network search engine 170. The search engine 170 can locate relevant information from the network 106 in response to a search query from a client device 102a. The search engine 170 then can provide a result set to the client device 102a via the network 106. The result set can comprise one or more article identifiers. An article identifier may be, for example, a Uniform Resource Locator (URL), a file name, a link, an icon, a path for a local file, or anything else that identifies an article. In one embodiment, an article identifier can comprise a URL associated with an article.

In one embodiment, the server device 150, or related device, has previously performed a crawl of the network 106 to locate articles, such as web pages, stored at other devices or systems coupled to the network 106, and indexed the articles in memory 162 or on another data storage device. It should be appreciated that other methods for indexing articles in lieu of or in combination with crawling may be used, such as manual submission.

It should be noted that other embodiments of the present invention may comprise systems having different architecture than that which is shown in FIG. 1. For example, in some other embodiments of the present invention, the client device 102a is a stand-alone device that is not permanently coupled to a network. The system 100 shown in FIG. 1 is merely exemplary, and is used to explain the exemplary methods shown in FIGS. 2 through 3.

Various methods in accordance with embodiments of the present invention may be carried out. For example, in one embodiment a search engine captures an event in real time upon the occurrence of the event, wherein the event comprises a user interaction with an article on a client device, wherein the article is capable of being associated with at least one of a plurality of client applications, updates a current user state based at least in part on the event, determines if the event should be indexed, and if the event should be indexed, indexes the event and stores the event and at least a portion of content associated with the article.

In another embodiment, a search engine may capture a plurality of events occurring on a client device, wherein the events are associated with at least one of a plurality of client applications, wherein at least some of the events are captured in real time upon the occurrence of the event, indexes and stores at least some of the events, wherein the events that are indexed and stored have an associated article, receives a search query, and locates relevant articles from events relevant to the search query. The search engine can also generate a search result set from the relevant articles. In one embodiment, the search query is entered by the user. In another embodiment, the search query is generated by the search engine based on a current user state determined from real-time events.

In another embodiment, a plurality of real-time events are captured in real time upon the occurrence of the real-time events, wherein each real-time event comprises a user interaction with an article on a client device, wherein the article is capable of being associated with at least one of a plurality of client applications, a plurality of historical events are captured that occurred in the past, wherein each historical event comprises a user interaction with an article on a client device, wherein the article is capable of being associated with at least one of a plurality of client applications, for each event, it is determined if the event should be indexed, and if the event should be indexed, the event is indexed and the event and at least a portion of content associated with the article are stored.

In another embodiment, an event is captured in real time upon the occurrence of the event, wherein the event comprises a user interaction with an article on a client device, wherein the article is capable of being associated with at least one of a plurality of client applications, a current user state is updated based at least in part on the event, the event is indexed and the event and at least a portion of content associated with the article are stored. In this embodiment, the event can be a real-time event or it can be a historical event.

In another embodiment, a plurality of events occurring on a client device are captured, wherein each event is associated with at least one of a plurality of client applications, at least some of the events are indexed and stored, wherein the events that are indexed and stored have an associated client article, a plurality of network articles are indexed, a search query is received, and relevant client articles and network articles are located based at least in part on the search query. In this embodiment, at least some of the events can be real-time events captured in real-time. The search query can be implicitly generated based at least in part on at least one real-time event.

Figure 2:
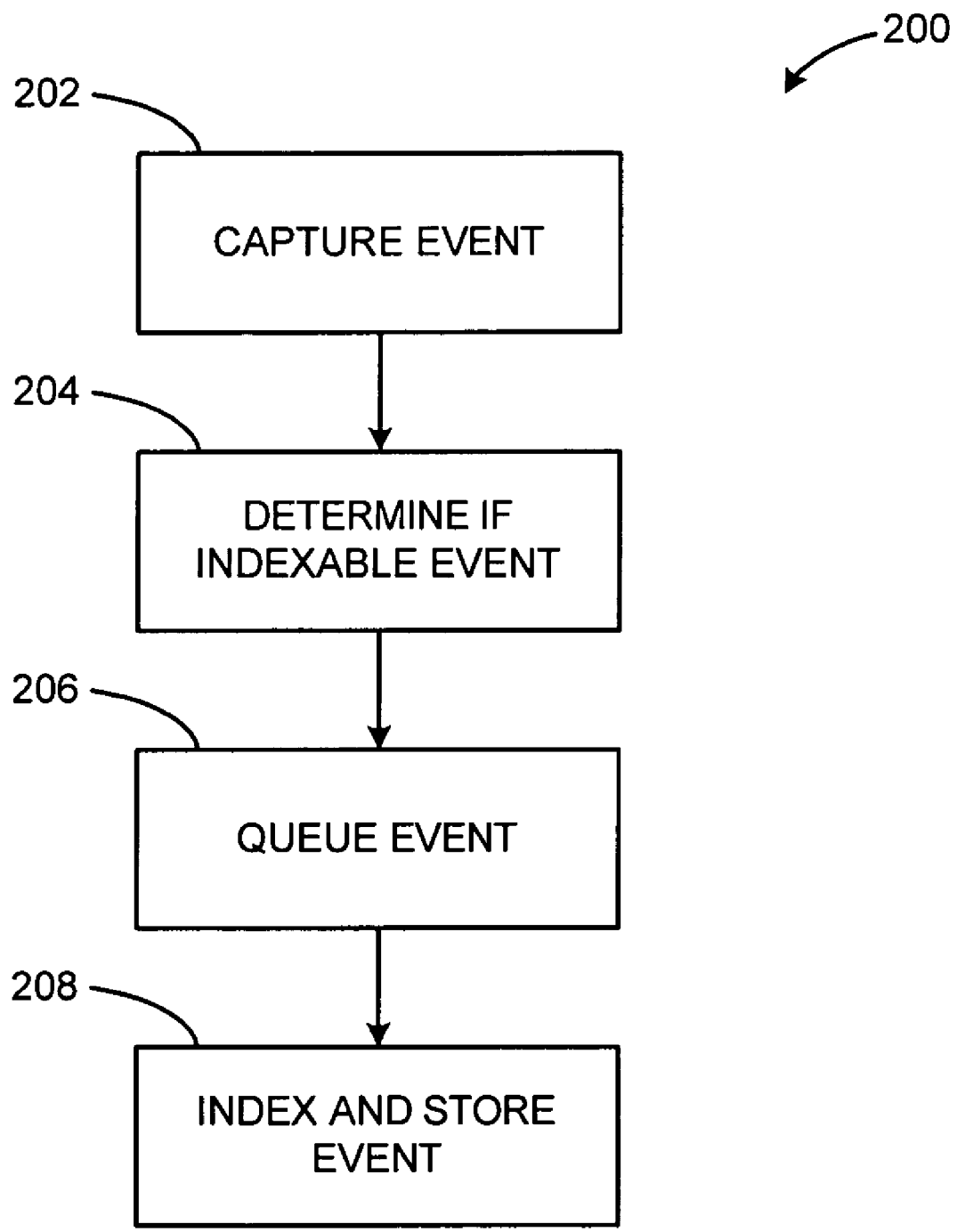
FIG. 2 is a flow diagram illustrating an exemplary method of capturing and processing event data associated with a client device in one embodiment of the present invention.

FIG. 2 illustrates an exemplary method 200 that provides a method for capturing and processing an event, in accordance with one embodiment of the invention. This exemplary method is provided by way of example, as it will be appreciated from the foregoing description of exemplary embodiments there are a variety of ways to carry out methods in other embodiments of the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In 202, the capture processor 124 captures an event. The event can be a real-time event or can be a historical event. The capture processor 124 can capture a real-time event by identifying and compiling event data associated with the event upon the occurrence of the event. The capture processor 124 can capture a historical event, for example, by periodically crawling the memory 108 or associated data storage device of the client device 112a for previously uncaptured articles or receiving articles or data from client applications and identifying and compiling event data associated with the event. The capture processor 124 may have separate capture components for each client application, network monitoring, performance data capture, keystroke capture, and display capture. In one embodiment, the capture component can use a generalized event definition mechanism, such as an event schema that it has previously defined and registered with the client device 102a, to capture or express the event.

In 204, the capture processor 124 determines whether the event captured is an indexable event. As explained above, some real-time events may not be indexed (non-indexable real-time events). In one embodiment, non-indexable real-time events are used to update the current user state and are, for example, examining a portion of an article, changing an article, and closing an article. In this embodiment, non-indexable events are not indexed or sent for storage by the indexer 130. Indexable events can be indexable real-time events or historical events. Examples of indexable events include the receipt of an email message, the viewing of a web page, the saving of a word processing document, and the sending of an instant messenger message.

If an indexable event is determined, then, in 206, the event can be sent by the capture processor 124 to the queue 126 with an indication that it is an indexable event. In the embodiment shown in FIG. 2, indexable real-time events are sent to both a user state queue and an index queue within queue 126 and historical events are sent to the index queue within the queue 126. Alternatively, indexable real-time events may not be sent to the user state queue to save computational time. The capture processor 124 can send the event in a form described by an event schema to the queue 126. If the event is determined to be a non-indexable event, then, in 206, the non-indexable event can be sent by the capture processor 124 to the user state queue of the queue 126 with an indication that it is not to be indexed. In an alternate embodiment, block 204 can be performed after and/or before block 206. For example, some events may be determined to be indexable or non-indexable by the capture processor 124 and other events may be determined to be indexable or non-indexable by the indexer 130.

In one embodiment, the queue 126 holds the event until the search engine is ready to receive it. Based on the event data, the event can be prioritized on the queue 126 for handling. For example, historical events are given a lower priority for processing by the queue 126 than real-time events. In one embodiment, when the indexer 130 is ready to process another event, it can retrieve an event or events from the index queue in the queue 126. The query system 132 can retrieve an event or events from the user state queue of the queue 126, when it is ready to update the user state. Location information from a captured event can be used to update the user state. In another embodiment, a queue is not used and events are sent directly to the search engine 122 from the capture processor 124.

In 208, the indexer 130 indexes and stores the event. The indexer 130 can retrieve an event from the queue 126 when it is ready to process the event. In one embodiment, the indexer 130 determines if the event is a duplicate event and if not assigns an Event ID to the event. The indexer 130 can also associate the event with related events. In the embodiment shown in FIG. 2, the indexer 130 can determine indexable terms associated with the event, dates and times associated with the event, and other data associated with the event from the event schema. The indexer 130 can associate the Event ID with the indexable terms that are contained in the index 142. The event can be stored in the database 144 and the content of the event can be stored in the repository 146. The capturing of events that are indexed and stored by the search engine 122 allows the user 122a to search for articles on the client device 102a and allows the search engine to automatically search for articles on the client device 102a.

Figure 3:
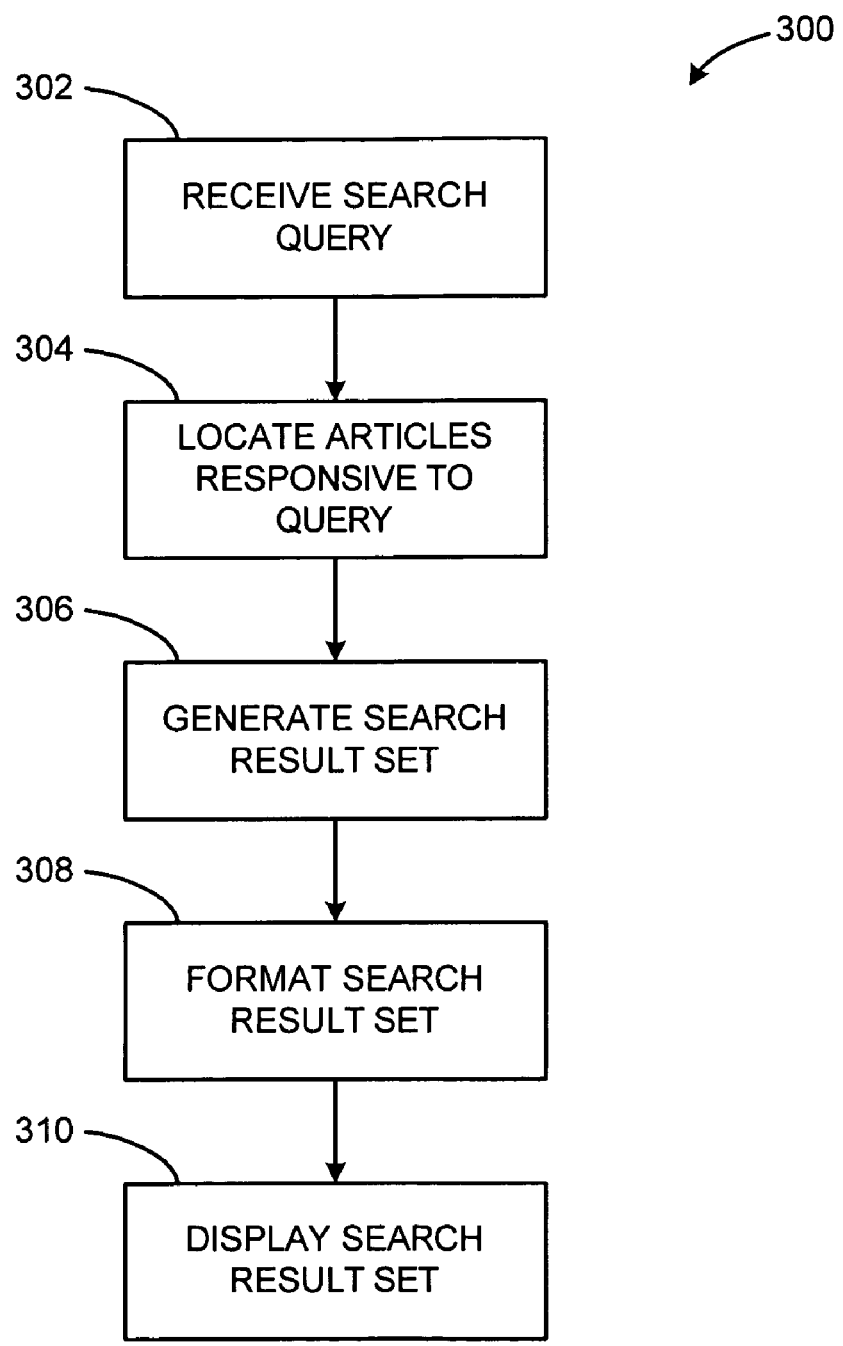
FIG. 3 is a flow diagram illustrating an exemplary method of retrieving articles associated with events in one embodiment of the present invention.

FIG. 3 illustrates an exemplary method 300 that provides a method for locating and retrieving articles on a client device, in accordance with one embodiment. This exemplary method is provided by way of example, as there are a variety of ways to carry out methods according to the present invention. The method 300 shown in FIG. 3 can be executed or otherwise performed by any of various systems. The method 300 is described below as carried out by the system 100 shown in FIG. 1 by way of example, various elements of the system 100 are referenced in the example method of FIG. 3.

In 302, the query system 132 receives a search query. The query can be an explicit query or an implicit query. An explicit query can be generated by a user inputting query terms into a search engine interface displayed on the client device 102a. An implicit query can be generated by the query system 132 based on a current user state. For example, the user 112a can enter the terms "agenda for monthly budget meeting" into a search engine interface. Alternatively, the user 112a can input the terms "agenda for monthly budget meeting" in an email the user 112a is drafting. The capture processor 124 can capture this contextual event and it can be received by the query system 132. The query system 132 can generate a search query based on the terms captured in this contextual event.

In 304, the query system 132 locates articles relevant to the search query. The query system 132 can locate relevant articles by matching the terms of the search query with terms located in the index 142. For example, the query system 132 can match the terms of the query with terms in the index 142. From the matched terms, the query system 132 can determine events, stored in the database 144, associated with the terms through event IDs associated with the matched terms. From these events, the query system 132 can determine articles associated with the events. The articles can be stored in the repository 146. For the search query "agenda for monthly budget meeting," for example, the query system 132 can locate various articles from various client applications that contain the query terms, such as, emails, presentation documents, word processing documents, spreadsheet documents and other articles matched to the terms of the query. The query can also designate a time and the query system 132 can locate articles that are relevant to the query time. The query can also designate an event-type and the query system 132 can locate articles of a specific type, such as, for example, word processing files or email messages. The query system 132 can also retrieve network articles from a search engine 170 that are relevant to the query.

In 306, the query system 132 generates a search result set based on the located articles. In one embodiment, the query system 132 can sort and rank the located articles based on a variety of signals indicating the user's 112a preference for the articles. The search result set can contain a ranked list of article identifiers for articles associated with a variety of different client applications 120 and article identifiers for network articles. Each link can also contain a summary of the article as well as an image associated with the article.

In 308, the search result set is formatted by the formatter 134. In one embodiment, the formatter 134 can format the result set in XML or HTML. In 310, the search result set is displayed on the client device 102a by the display processor 128. For example, the search result set can be displayed on the display device associated with the client device 102a. If the search result set was generated in response to an implicit query the display processor 128 can determine an appropriate time to display the implicit search result set. The user 112a can then select an article identifier for an article and cause the display of the associated article on the display device.

The environment shown reflects a client-side search engine architecture embodiment. Other embodiments are possible, such as a stand-alone client device or a network search engine.

While the above description contains many specifics, these specifics should not be construed as limitations on the scope of the invention, but merely as exemplifications of the disclosed embodiments. For example, the examples of articles and events are illustrative and are not intended to be limiting. Those skilled in the art will envision many other possible variations that are within the scope of the invention.

That which is claimed:

1. A method for information capture and retrieval, the method comprising:
   capturing an event, the event comprising a user interaction with an article on a client device;
   determining whether the event is an indexable event;
   responsive to the event being determined an indexable event:
      determining whether the indexable event is an indexable real-time event or an indexable historical event,
      responsive to the indexable event being determined an indexable real-time event, placing the event in a user state queue,
      placing the indexable event in a multiple priority index queue, wherein an indexable real-time event in the index queue is assigned a high priority and an indexable historical event in the index queue is assigned a low priority,
      retrieving a high-priority event from the index queue before retrieving a low-priority event from the index queue, and
      indexing the high-priority event in an index before indexing the low-priority event in the index; and
   responsive to the event being determined a non-indexable event:
      placing the non-indexable event in the user state queue, the user state queue being separate from the index queue,
      retrieving the non-indexable event from the user state queue, and determining a current user state for the user based on the non-indexable event.

2. The method of claim 1, wherein the event is captured in the form of a pre-defined event schema.

3. The method of claim 1, wherein the user interaction with the article comprises loading the article.

4. The method of claim 1, wherein the user interaction with the article comprises saving the article.

5. The method of claim 1, wherein the user interaction with the article comprises viewing the article.

6. The method of claim 1, wherein the user interaction with the article comprises updating a metadata of the article.

7. The method of claim 6, wherein updating the metadata of the article comprises book-marking the article.

8. The method of claim 6, wherein updating the metadata of the article comprises printing the article.

9. The method of claim 6, wherein updating the metadata of the article comprises deleting the article.

10. The method of claim 6, wherein updating the metadata of the article comprises moving the article.

11. The method of claim 1, further comprising:
    receiving a search query;
    determining whether the event is associated with the search query by searching the index; and
    responsive to the event being associated with the search query, generating a search result based on the article.

12. The method of claim 11, wherein the search query is entered by a user.

13. The method of claim 11, further comprising locating network articles relevant to the search query.

14. The method of claim 13, wherein generating the search result based on the article comprises generating the search result based on the article and the network articles.

15. A computer-readable storage medium encoded with an executable computer program, the computer program comprising program code for:
    capturing an event, the event comprising a user interaction with an article on a client device;
    determining whether the event is an indexable event;
    responsive to the event being determined an indexable event:
       determining whether the indexable event is an indexable real-time event or an indexable historical event,
       responsive to the indexable event being determined an indexable real-time event, placing the event in a user state queue,
       placing the indexable event in a multiple priority index queue, wherein an indexable real-time event in the index queue is assigned a high priority and an indexable historical event in the index queue is assigned a low priority,
       retrieving a high-priority event from the index queue before retrieving a low-priority event from the index queue, and
       indexing the high-priority event in an index before indexing the low-priority event in the index; and
    responsive to the event being determined a non-indexable event:
       placing the non-indexable event in the user state queue, the user state queue being separate from the index queue,
       retrieving the non-indexable event from the user state queue, and
       determining a current user state for the user based on the non-indexable event.

16. The computer-readable storage medium of claim 15, wherein the event is captured in the form of a pre-defined event schema.

17. The computer-readable storage medium of claim 15, wherein the user interaction with the article comprises loading the article.

18. The computer-readable storage medium of claim 15, wherein the user interaction with the article comprises saving the article.

19. The computer-readable storage medium of claim 15, wherein the user interaction with the article comprises viewing the article.

20. The computer-readable storage medium of claim 15, wherein the user interaction with the article comprises updating a metadata of the article.

21. The computer-readable storage medium of claim 20, wherein updating the metadata of the article comprises book-marking the article.

22. The computer-readable storage medium of claim 20, wherein updating the metadata of the article comprises printing the article.

23. The computer-readable storage medium of claim 20, wherein updating the metadata of the article comprises deleting the article.

24. The computer-readable storage medium of claim 20, wherein updating the metadata of the article comprises moving the article.

25. The computer-readable storage medium of claim 15, wherein the computer program further comprises program code for:
   receiving a search query;
   determining whether the event is associated with the search query by searching the index; and
   responsive to the event being associated with the search query, generating a search result based on the article.

26. The computer-readable storage medium of claim 25, wherein the search query is entered by a user.

27. The computer-readable storage medium of claim 25, wherein the computer program further comprises program code for locating network articles relevant to the search query.

28. The computer-readable storage medium of claim 27, wherein generating the search result based on the article comprises generating the search result based on the article and the network articles.

29. A system for information capture and retrieval, the system comprising:
   a computer readable storage medium comprising:
      a capture processor configured for capturing an event, wherein the event comprises a user interaction with an article on a client device, the capture processor further configured for determining whether the event is an indexable event and determining, responsive to the event being determined an indexable event, whether the indexable event is an indexable real-time event or an indexable historical event;
      a queue comprising a user state queue and a multiple priority index queue,
         wherein responsive to the event being determined an indexable event, the capture processor is further configured for placing the indexable event in the multiple priority index queue, wherein an indexable real-time event in the index queue is assigned a high priority and an indexable historical event in the index queue is assigned a low priority, and an indexer is configured for retrieving a high-priority event from the index queue before retrieving a low-priority event from the index queue, and indexing the high-priority event in an index before indexing the low-priority event in the index,
         wherein responsive to the event being determined an indexable real-time event, placing the event in the user state queue, and
         wherein responsive to the event being determined a non-indexable event, the capture processor is further configured for placing the non-indexable event in the user state queue, and a queue system is configured for retrieving the non-indexable event from the user state queue and determining a current user state for the user based on the non-indexable event, the indexer; and the query system.

* * * * *